United States Patent
Cha et al.

(10) Patent No.: US 7,450,508 B2
(45) Date of Patent: Nov. 11, 2008

(54) DYNAMIC QUALITY-OF-SERVICE MAPPING APPARATUS AND METHOD THROUGH HYBRID MONITORING IN DIGITAL HOME SERVICE

(75) Inventors: Do-Hun Cha, Suwon-si (KR); Chang-Sup Shim, Seoul (KR); Jun-Ho Koh, Suwon-si (KR)

(73) Assignee: Samsung Electronics Co., Ltd., Maetan-Dong, Yeongtong-Gu, Suwon-Si, Gyeonggi-Do (KR)

( * ) Notice: Subject to any disclaimer, the term of this patent is extended or adjusted under 35 U.S.C. 154(b) by 577 days.

(21) Appl. No.: 11/100,125

(22) Filed: Apr. 6, 2005

(65) Prior Publication Data

US 2006/0146703 A1 Jul. 6, 2006

(30) Foreign Application Priority Data

Dec. 16, 2004 (KR) .................... 10-2004-0107141

(51) Int. Cl.
*H04J 1/16* (2006.01)
(52) U.S. Cl. .................................... 370/232
(58) Field of Classification Search ........... 370/231, 370/398, 395.21, 395.32, 420, 395.4, 395.41, 370/395.42, 395.43, 241, 244, 249, 252, 370/232, 233, 234, 235, 236, 236.1
See application file for complete search history.

(56) References Cited

U.S. PATENT DOCUMENTS

| 6,594,277 | B1 * | 7/2003 | Chiang et al. ............... 370/465 |
| 6,823,392 | B2 * | 11/2004 | Cherkasova et al. ......... 709/229 |
| 2003/0046384 | A1 * | 3/2003 | Sirivara et al. .............. 709/224 |
| 2004/0071084 | A1 * | 4/2004 | El-Hennawey et al. ...... 370/230 |

* cited by examiner

*Primary Examiner*—Aung S Moe
*Assistant Examiner*—Juvena Loo
(74) *Attorney, Agent, or Firm*—Cha & Reiter, LLC (57) ABSTRACT

A media server coupled to a service network by means of a media gateway provides network-adaptive media streams through hybrid monitoring for the digital home service. Clients coupled to the service network measures a network state of the service network and system states of the clients through the hybrid monitoring. A monitoring server includes a domain manager and receives metric information fed back from the clients, performs comparison and analysis with respect to the received measurement information, determines causes of quality degradation of the digital home service, and delivers indication information according to the causes to the media server and the media gateway. The domain manager also determines a problem of the media streams according to a predetermined policy and an analysis result of the condition-analyzing unit and for creating the indication information in order to solve the problem.

13 Claims, 7 Drawing Sheets

DYNAMIC QUALITY-OF-SERVICE MAPPING APPARATUS AND METHOD THROUGH HYBRID MONITORING IN DIGITAL HOME SERVICE

CLAIM OF PRIORITY

This application claims priority to an application entitled "Dynamic Quality-of-Service Mapping Apparatus and Method through Hybrid Monitoring in Digital Home Service," filed in the Korean Intellectual Property Office on Dec. 16, 2004 and assigned Serial No. 2004-107141, the contents of which are incorporated herein by reference.

BACKGROUND OF THE INVENTION

1. Field of the Invention

The present invention relates to digital home service and, more particularly, to an effective digital home media distribution apparatus and method for realizing high-quality media streaming in real time through a digital communication network.

2. Description of the Related Art

Recently an interest in digital home service provided using an Internet protocol (IP) network is growing due to a rapid development in the multimedia and network technology. The digital home service provides entertainment service in real time based on digital media contents via high-definition (HD) digital video devices. Thus, it is necessary to provide real-time media services that are capable of distributing seamless and sequential media streams to all digital home media receivers. However, since a QoS (quality-of-service) model of a current IP network employs a best-effort (BE) scheme regardless of service types, the QoS model cannot ensure end-to-end QoS required for the real-time applications in the digital media streaming.

Accordingly, there is a need for a new network to realize real-time and high-quality media streaming in an IP network. In particular, an adaptive media-streaming scheme applicable to a network environment that changes dynamically is required for the IP streaming service. There are various schemes for realizing the network adaptive media streaming, but the schemes may be largely divided into an end-to-end adaptive scheme and an adaptive scheme, which relates network-intermediate nodes according to adaptation positions.

In the end-to-end adaptive scheme, both a transmitter and a receiver take a leading role in a network, wherein the transmission end inserts information for dynamically adjusting the media transmission rate and for coping with a loss environment using the metric information feedback from the reception end. In contrast, the adaptive scheme emphasizes the roles of intermediate nodes serving to distribute media streams, such as a media gateway (MG) and a home gateway (HG).

In addition, while the end-to-end adaptive scheme focuses on the dynamic control of QoS based on streams, the adaptive scheme may be applied to an environment having plural receivers by controlling plural streams based on QoS classes (class-based aggregated QoS mapping). In this case, relatively dynamic adaptive schemes such as proxy/cashing and trans-coding may be employed.

In order to employ the adaptive media-transmission schemes, a metric for representing the end-to-end performance with respect to media transmission must be defined, and then a monitoring scheme for measuring the metric must be performed. Accordingly, to realize HD media streaming for guaranteeing quality of service in digital homes connected to a broadband network, an end-to-end network adaptive transmission technique must be employed together with the adaptive scheme relating to the intermediate nodes for metrics relating to media stream delivery. Therefore, it is necessary to employ an approaching scheme that can stabilize and improve a network-adaptive media delivery framework in accordance with a targeted service and network environment by well-harmonizing interfaces while utilizing elementary techniques in proper combination.

Figure 1:
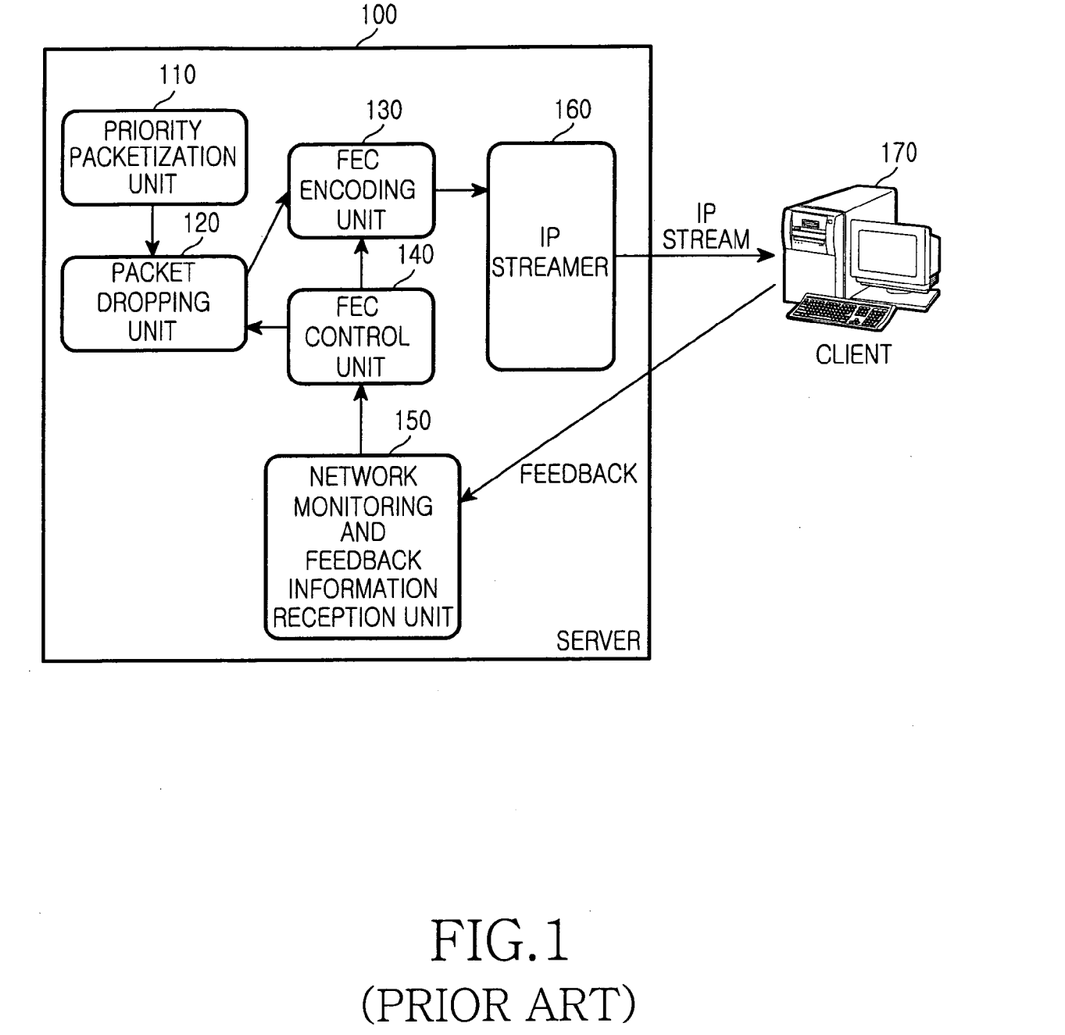
FIG. 1 shows a network adaptive framework for transmission of a moving picture employing the conventional end-to-end adaptive scheme.

FIG. 1 shows a network adaptive framework for transmission of a moving picture employing the conventional end-to-end adaptive scheme.

As shown, a server 100 at the transmission end performs a relative prioritization scheme based on a temporal scalability of a video. To this end, the server 100 includes a priority packetization unit 110 for performing real-time parsing and prioritized packetization with respect to media streams, a packet dropping unit 120, and an IP streamer 160 for performing scheduling.

In operation, a network monitoring and feedback information reception unit 150 receives feedback information regarding transmission quality between the server and a client 170 from the client 170 and provides feedback information to a forward error correction (FEC) control unit 140. The FEC control unit 140 controls the packet dropping unit 120 and an FEC encoding unit 130 according to the feedback information. The priority packetization unit 110 parses media streams in real time and creates packets having priority. The packet dropping unit 120 removes packets having relatively low priority or bypasses all packets under the control of the FEC control unit 140. The FEC encoding unit 130 receives packets from the packet dropping unit 120 for error correction and encodes the received packets according to a coding rate determined by the FEC control unit 140. The IP streamer 160 adds three-layer and two-layer headers to the encoded packets to create IP packet streams. Thereafter, the IP packet streams are delivered to the client 170.

The server 100 provides media streams with a transmission rate suitable for a current network condition and also provides a receiver condition by adjusting a frame transmission rate of a video stream occupying the largest bandwidth among the media streams. Meanwhile, data prioritizing can be performed according to packets, frames, and objects by the priority packetization unit 110.

Figure 2:
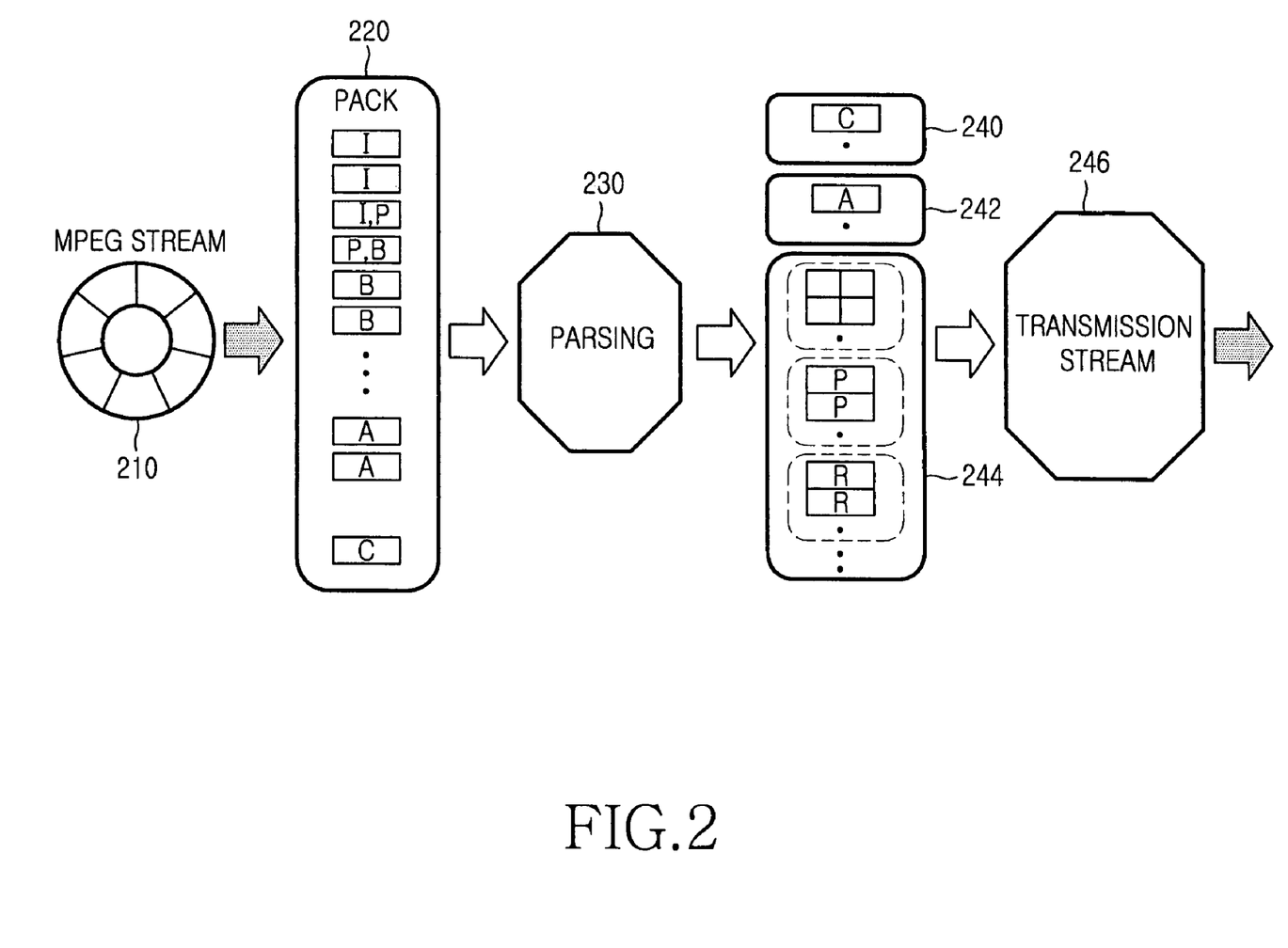
FIG. 2 depicts a parsing scheme and a data-prioritizing scheme using an MPEG-2 program stream (PS)

FIG. 2 shows a parsing scheme and a data-prioritizing scheme using an MPEG-2 program stream (PS) 210.

The MPEG-2 PS 210 is formed based on a pack 220. The pack 220 includes I packets, an I/P packet, a P/B packet, B packets, an audio packet, and a control packet, which are packetized elementary streams (PESs) having variable sizes. In order to prioritize data according to frames, the PES packets included in the pack 220 are separated from each other through parsing 230.

After the parsing 230, the MPEG-2 PS pack 220 is separated into control packets 240, audio packets 242, and video packets 244 divided according to frames. The packets 240 to 244 become transport streams (TSs) 246 through transport-aware packetization that is predetermined according to the priorities of frame types.

Referring back to FIG. 1, packets prioritized by the priority packetization unit 110 have priorities in the order of the I frame, the P frame, and the B frame and then transmitted through the packet dropping unit 120 when the transmission rate control is required according to the feedback information. The output of the packet dropping unit 120 is inputted to an FEC encoder 130 for adaptation transport based on FEC.

The FEC encoder 130 performs an adaptive FEC scheme for dynamically adjusting the FEC strength according to network conditions.

The conventional technique allowing the above-mentioned operation employs an adaptive media-streaming scheme in which media streams are transmitted suitably for dynamically-changing network conditions, and general network monitoring is actively or passively performed. Herein, the active network monitoring enables exact measurement of a network state in a case of shortening transmission periods of packets. In this case, the active network monitoring exerts an influence on QoE (Quality of Experience) of a user by increasing the amount of packets in the network. In contrast, in the passive network monitoring for measuring the network state by using user data, since a great amount of data is collected and analyzed, a great amount of system resources is required. Thus, it is difficult to adjust a measurement period or a measurement time duration. Also, the conventional technique cannot be applied to point to multi-point transmission such as broadcasting or multicasting because end-to-end monitoring information is used. Meanwhile, in a differential service (Diff-Serv) domain supporting QoS by allowing only a server to perform network monitoring and network elements such as routers, cannot dynamically perform QoS mapping.

SUMMARY OF THE INVENTION

Accordingly, the present invention has been made to solve the above-mentioned problems occurring in the prior art and provides additional advantages, by providing an apparatus and a method that are capable of transmitting media streams efficiently in a broadband network providing differential services.

One aspect of the present invention is to provide a hybrid-monitoring apparatus and a method thereof for combining active monitoring and passive monitoring in broadband network-transmitting media streams.

Another aspect of the present invention is to provide an apparatus and a method in which a monitoring server compares and analyzes monitoring information to detect causes of quality degradation, selects a suitable adaptive scheme according to the causes, and delivers the selected adaptive scheme to network elements in a broadband network, thereby allowing the network elements to perform dynamic QoS mapping.

In one embodiment, there is provided an apparatus for dynamic quality-of-service (QoS) mapping through a hybrid monitoring in digital home service, and the apparatus includes a media server for providing network adaptive media streams for the digital home service; a media gateway for connecting the media server to a service network; clients coupled to the service network for receiving media streams from the media server and measuring a network state of the service network and system states of the clients through hybrid monitoring, and for a monitoring server including a domain manager; a domain manger receiving metric information fed back from the clients, performing comparison and analysis with respect to the received measurement information, determining the causes of quality degradation of the digital home service, and delivering indication information according to the causes to the media server and the media gateway.

The domain manager further includes a collection module for receiving the metric information about the network state and the system states from the clients, a condition analysis unit for analyzing system conditions and network conditions based on the metric information provided through the collection module, and a network adaptation manager for determining the problem of media streams according to a predetermined policy and an analysis result of the condition-analyzing unit, and for creating the indication information in order to solve the problem.

In another embodiment, there is provided a method for dynamic quality-of-service (QoS) mapping through hybrid monitoring in digital home service, the method comprising the steps of measuring a network state of a service network and system states of clients through hybrid monitoring of the clients coupled to a media server through a service network to receive media streams from the media server, and receiving metric information fed back from the clients, performing comparison and analysis with respect to the received measurement information, determining causes of quality degradation of the digital home service, and delivering indication information according to the causes to the media server and the media gateway.

BRIEF DESCRIPTION OF THE DRAWINGS

The above features and advantages of the present invention will be more apparent from the following detailed description taken in conjunction with the accompanying drawings, in which.

DETAILED DESCRIPTION

Hereinafter, an embodiment of the present invention will be described in detail with reference to the accompanying drawings. For the purposes of clarity and simplicity, a detailed description of known functions and configurations incorporated herein will be omitted as it may make the subject matter of the present invention unclear.

According to the teachings of the present invention, a server performs an optimum dynamic QoS mapping in a differential service (Diff-Serv) network supporting class-based QoS in order to efficiently transmit media streams to multiple subscribers, instead of a conventional way of controlling a transmission rate to transmit end-to-end media streams.

Figure 3:
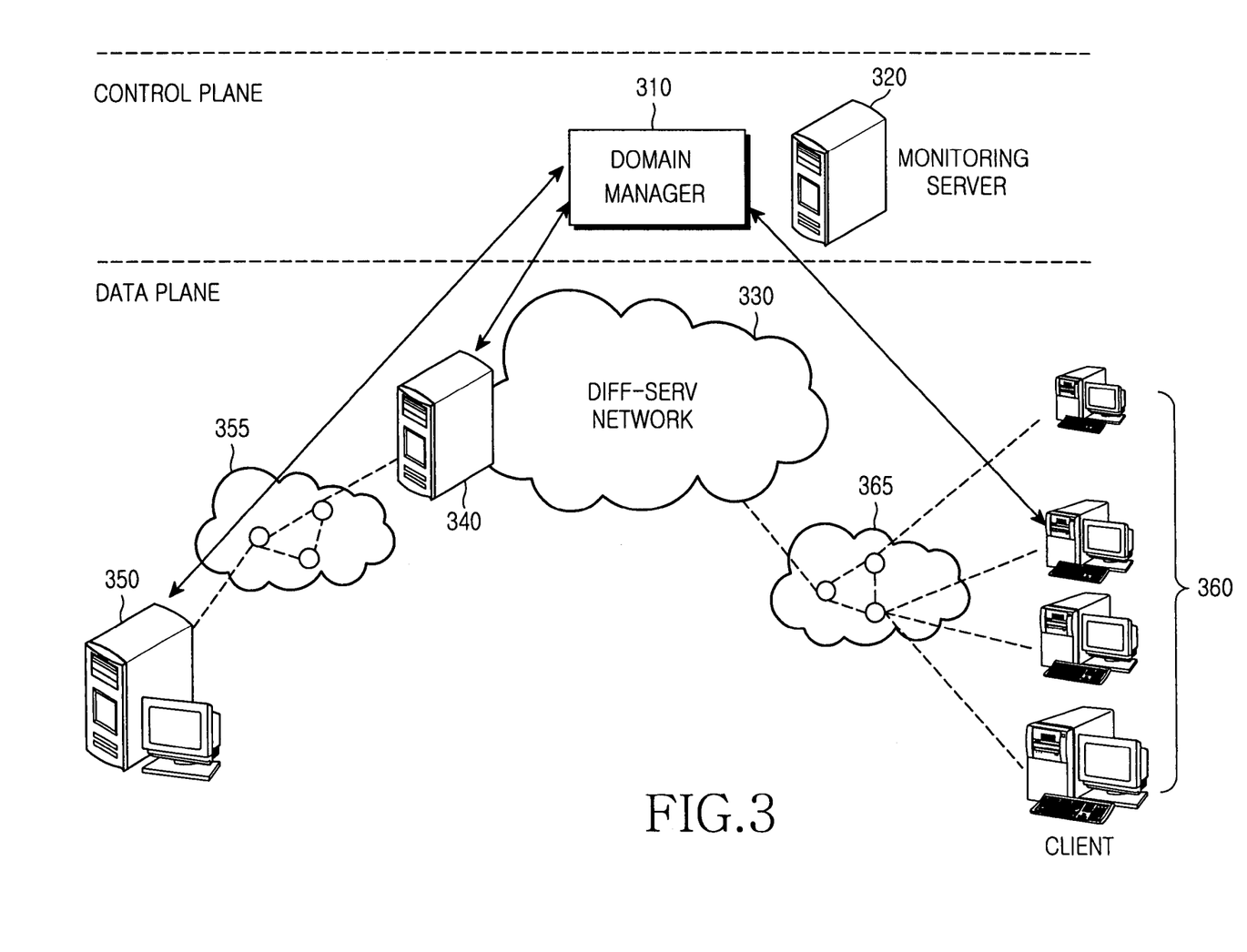
FIG. 3 illustrates the structure of a system for performing effective media streaming according to an embodiment of the present invention.

FIG. 3 illustrates the structure of a system for performing effective media streaming according to an embodiment of the present invention. As shown, the system includes a media server 350 for prioritizing packets and making packet streams, a media gateway 340 for receiving the packet streams and performing the optimum QoS mapping, and a hybrid monitoring server 320 for collecting and analyzing metric information for dynamic QoS mapping. A plurality of hybrid monitoring clients 360 represents a receiving side, and the hybrid monitoring server 320 represents to transmitting side.

The media server 350 is coupled to the media gateway 340 through a local network 355. The media gateway 340 delivers the packet streams transmitted from the media server 350 to another local network 365 through the Diff-Serv network 330. The clients 360 receive the packet streams from the media server 350 through the local network 365.

The monitoring server 320 includes a domain manager 310, which receives and analyzes feedback information transmitted from the clients 360, and delivers the analysis result to the media server 350 and the media gateway 340.

In addition, the domain manager 310 monitors the network state and the system state. To this end, the clients 360 employ a hybrid-monitoring scheme that uses an active monitoring scheme together with the passive monitoring scheme.

The active monitoring scheme measures various network metrics such as delay, jitters, and loss rates by transmitting multicast measurement packets onto the network, and then retrieving the multicast measurement packets to retrieve the information. The passive monitoring detects a user traffic state by analyzing RTTCP (real-time transport control protocol) packets and measures the usage of both the central processing unit (CPU) and the memory representing a system state.

Information detected through the hybrid-monitoring scheme is fed back to the domain manager 310, so that the domain manager 310 can detect causes of quality degradation by comparing and analyzing the detected information. Consequently, the domain manager 310 selects a proper adaptive scheme according to the causes.

Figure 4A:
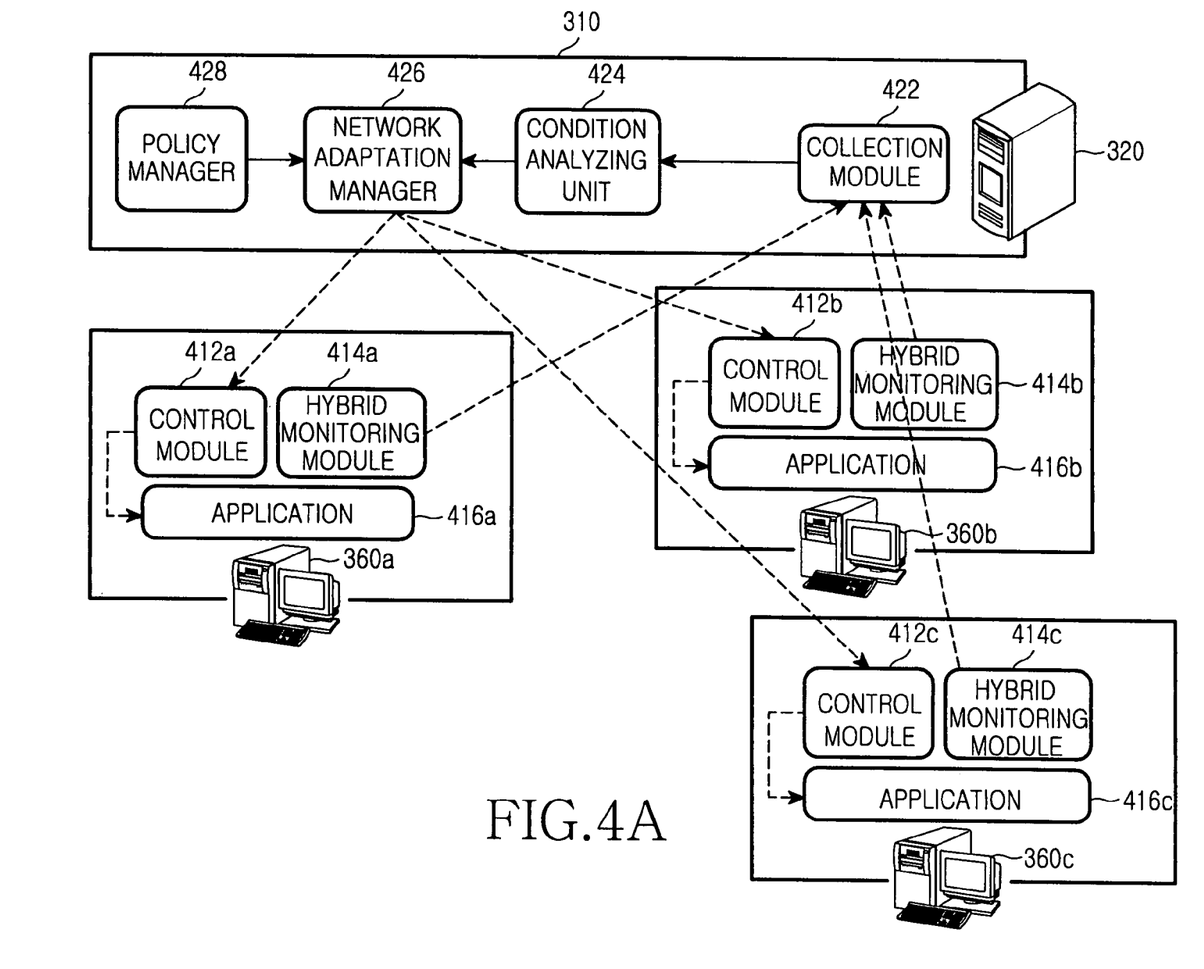
FIG. 4*a* shows a whole framework through a hybrid-monitoring scheme according to the embodiment of the present invention.

FIG. 4a illustrates the whole framework of the hybrid-monitoring scheme according to the embodiment of the present invention in detail.

Figure 4B:
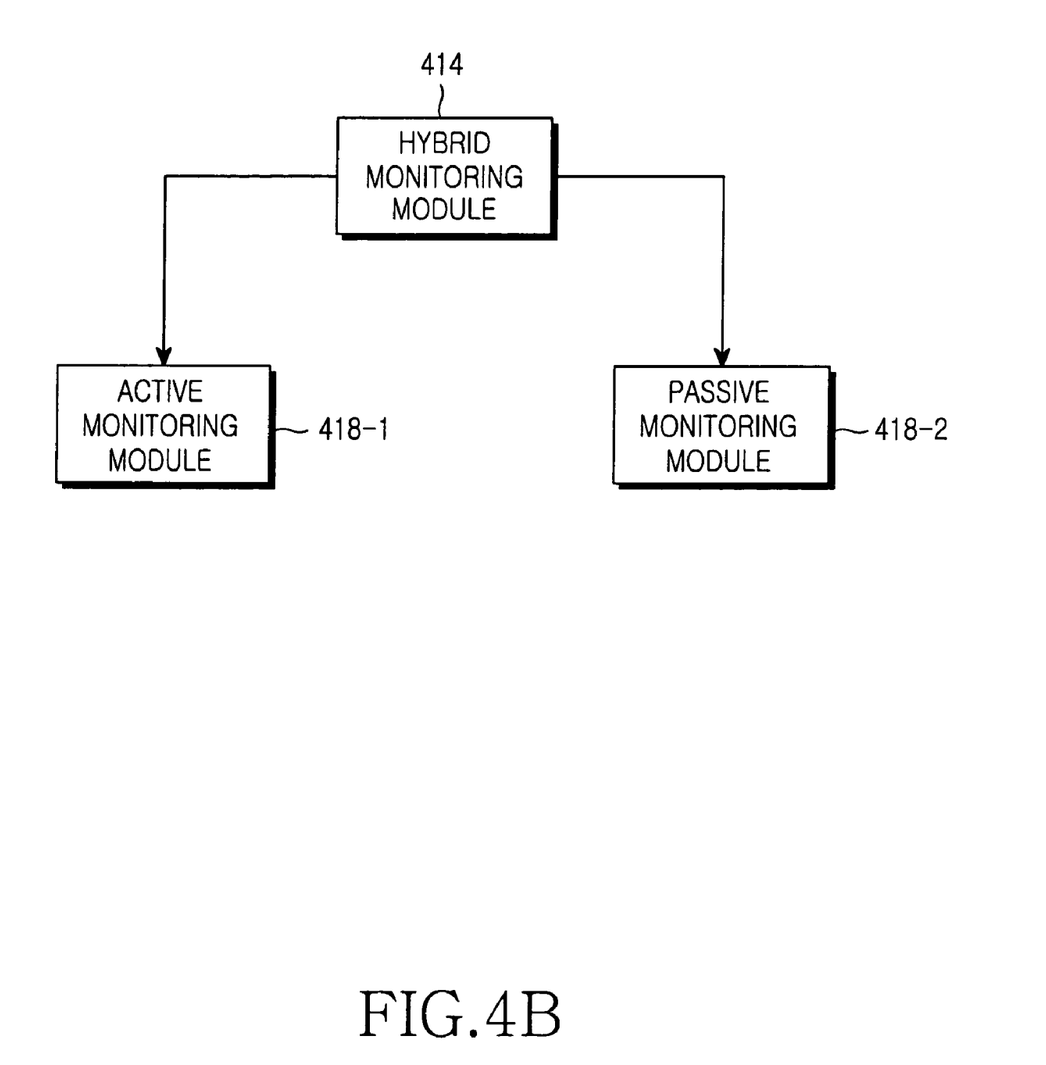
FIG. 4*b* shows an entire framework through a hybrid-monitoring scheme according to the embodiment of the present invention.

Hybrid-monitoring clients 360a, 360b, and 360c detect a network state and a node system state (that is, a corresponding the state of clients) and transmit the detected states to the monitoring server 320. Each client has hybrid-monitoring modules 414a, 414b, and 414c, i.e., 414 including an active monitoring module 418-1 and a passive monitoring module 418-2 as shown in FIG. 4b.

The passive monitoring module 418-2 detects the state of a user data flow by analyzing RTCP packets. Detected metrics include jitters, delay, and loss rates. Herein, the RTCP packets are used for detecting the state information of a user data flow currently used in a real-time media transmission program. According to the present invention, the RTCP packets are analyzed instead of RTP packets in order to reduce the number of system nodes. In order to analyze the RTCP packets, the passive monitoring module 418-2 may include an RTCP_feedback module (not shown). The RTCP_feedback module obtains metric information including SSRC (synchronization source), RTT, jitters, and loss rates by receiving and analyzing the RTCP packets and transmits the metric information to the dynamic monitoring module 418-1. Herein, the SSRC is used for distinguishing participants of a session. Accordingly, the dynamic monitoring module 418-1 generates, transmits, and retrieves measurement packets, thereby measuring RTT, jitters, and loss rates.

Referring back to FIG. 4a, the domain manager 310 of the hybrid-monitoring server 320 further includes a collection module 422, a condition analyzing unit 424, a network adaptive manager 426, and a policy manager 428. The collection module 422 collects metric information fed back from the hybrid-monitoring modules of the clients 360. The condition analyzing unit 424 analyzes network conditions and system conditions according to the metric information. The network adaptation manager 426 selects adaptive schemes suitable for the network conditions and the system conditions according to a predetermined service policy provided by the policy manager 428. The selected adaptive schemes are provided to the media server 350 and the media gateway and then used for network adaptive QoS mapping.

The selected adaptive schemes may be provided to the control modules 412a, 412b, and 412c of the corresponding clients 360. The application modules 416a, 416b, and 416c of the clients 360 perform the related operations according to the adaptive schemes under the control of the control modules.

The hybrid-monitoring server 320 collects and analyzes metric information transmitted by the clients 360. The metric information sent by the clients 360 may be divided into two types. One type is information regarding a client sending analysis information, and the other type is information relating to the state information of a data flow obtained by analyzing the RTCP packets. The hybrid-monitoring server 320 stores information relating the clients 360 and state information relating data flows between clients in a hash data structure with a matrix form, while employing the value of SSRC as a key. Herein, since the metric information is transmitted from all clients 360 participating in a multicast network, state information regarding data flows between users in the whole network is stored in the hash structure of the hybrid-monitoring server 320.

Figure 5:
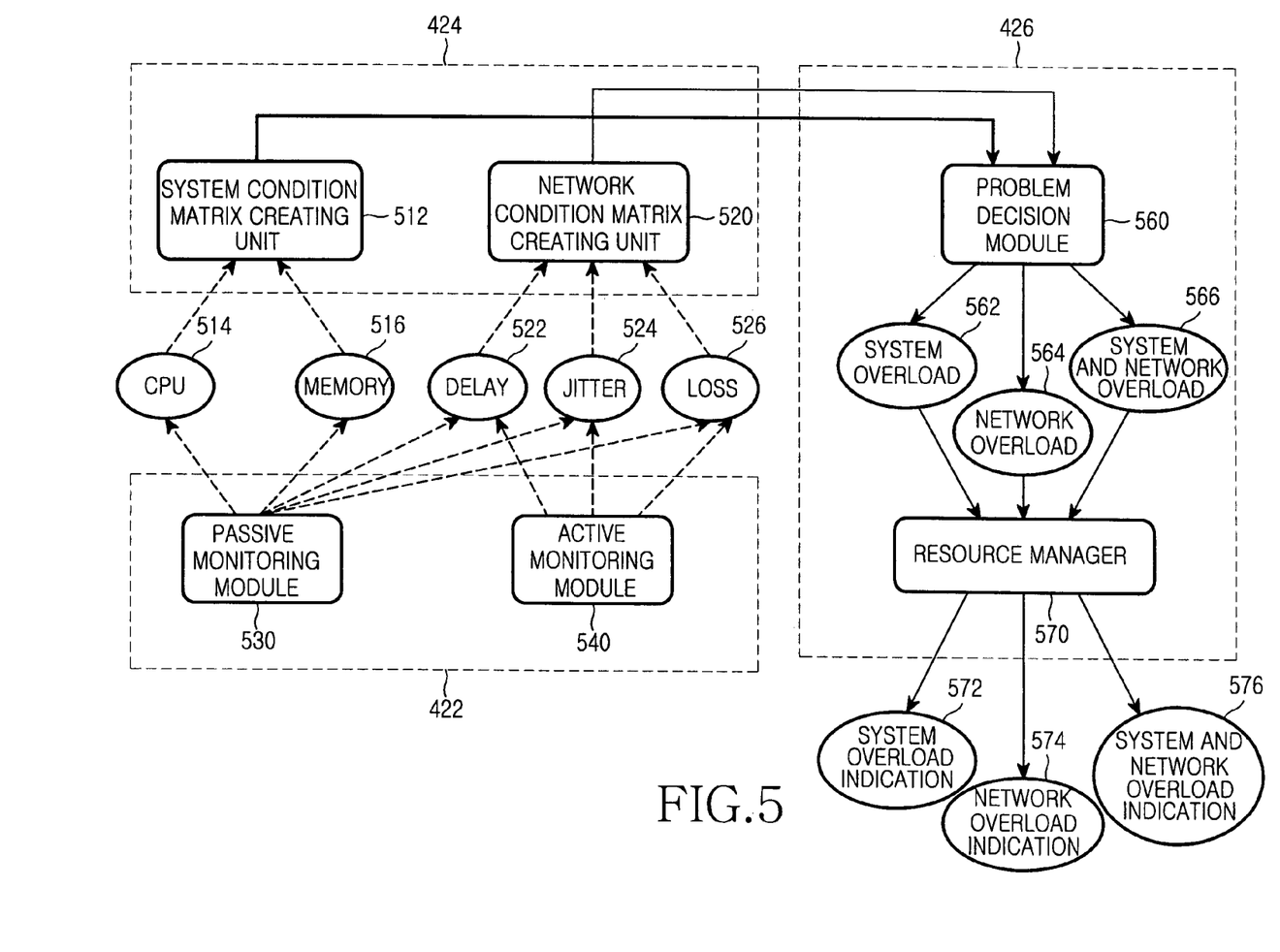
FIG. 5 illustrates the operation of a hybrid-monitoring server in detail according to the embodiment of the present invention.

FIG. 5 is a view showing an operation of the hybrid-monitoring server 320 in detail according to the embodiment of the present invention.

As shown, the collection module 422 includes an active monitoring module 540 and a passive monitoring module 530 corresponding to the passive monitoring module 418-2 and the active monitoring module 418-1 of the clients 360, respectively. Herein, the passive monitoring module 530 outputs system information such as states of a memory 516 and a CPU 514 corresponding to the clients 360 and data-flow information such as delay 522, jitters 524, and loss rates 526 obtained by analyzing RTCP packets as described earlier. Further, the active monitoring module 540 outputs data flow information such as delay 522, jitters 524, and loss rates 526 obtained by analyzing measurement packets created by the active monitoring module 540.

The condition analyzing unit 424 includes a system condition matrix creating unit 512 and a network condition matrix creating unit 520. The system condition matrix creating unit 512 creates a system condition matrix representing the state for a system of each client using system information provided by the passive monitoring module 530. The network condition matrix creating unit 520 creates a network condition matrix representing the state for a network for each client using data flow information provided from the passive monitoring module 530 and the active monitoring module 540.

The network adaptation manager 426 includes a problem decision module 560 and a resource manager 570. The problem decision module 560 determines the generated overload type from a system overload 562, network overload 564, and system and network overload 566 by analyzing the system condition matrix and the network condition matrix. The resource manager 570 transmits one of a system overload indication 572, a network overload indication 574, and a system/network overload indication 576 to the media server 350 and/or the media gateway 340 according to the determined overload type.

According to the present invention, the system overload indication 572 includes control information regarding a coding rate for FEC coding, filtering for packet dropping (jittering), and a transmission rate for media streams. The network overload indication 574 includes control information regarding whether or not a transmission rate is controlled and whether or not FEC coding is applied. The system/network overload indication 576 includes control information regarding a transmission rate. Therefore, the media server 350 can perform priority packetization, packet dropping, FEC coding, scheduling, etc., according to the indications 573, 574, and 576. Herein, since a detailed operation and a detailed procedure for media stream control by the media server 350 do not relate to the subject matter of the present invention, the detailed description about the operation and procedure will be omitted for simplicity. In the same manner, the media gateway 340 can perform QoS mapping, priority class marking, etc., according to the indications 573, 574, and 576.

The Diff-Serv network (a representative QoS network model) employs a concept of differentiating service by guaranteeing QoS based on an individual flow aggregation and a mechanism for allowing network border routers to process all complex traffic control functions and the inner parts of the network to process only very simple packet delivering functions, thereby obtaining scalability applicable to a large-scale Internet having plural ISP (Internet service provides) connections. In the QoS network such as the Diff-Serv network, it is important to employ an effective resource-allocation technique based on priority classes rather than flows. Therefore, the border routers of the Diff-Serv network classify and mark packets in order to determine a way of delivering the packets in the Diff-Serv network. In addition, the border routers perform control functions including traffic metering and traffic policing in order to determine whether or not traffic is transmitted according to a predetermined protocol.

To this end, as suggested through the framework of FIG. 1, a QoS mapping function for QoS provisioning is added to the functions of the media gateway playing the role of the border router. Herein, the QoS mapping function can be selectively applied to a home gateway (HW) of a reception network end in consideration of a digital home network. As described in the concept of the Diff-Serv, the media gateway and the home gateway provide the QoS mapping function based on plural flows (aggregation sense), not flows such as streams.

Figure 6:
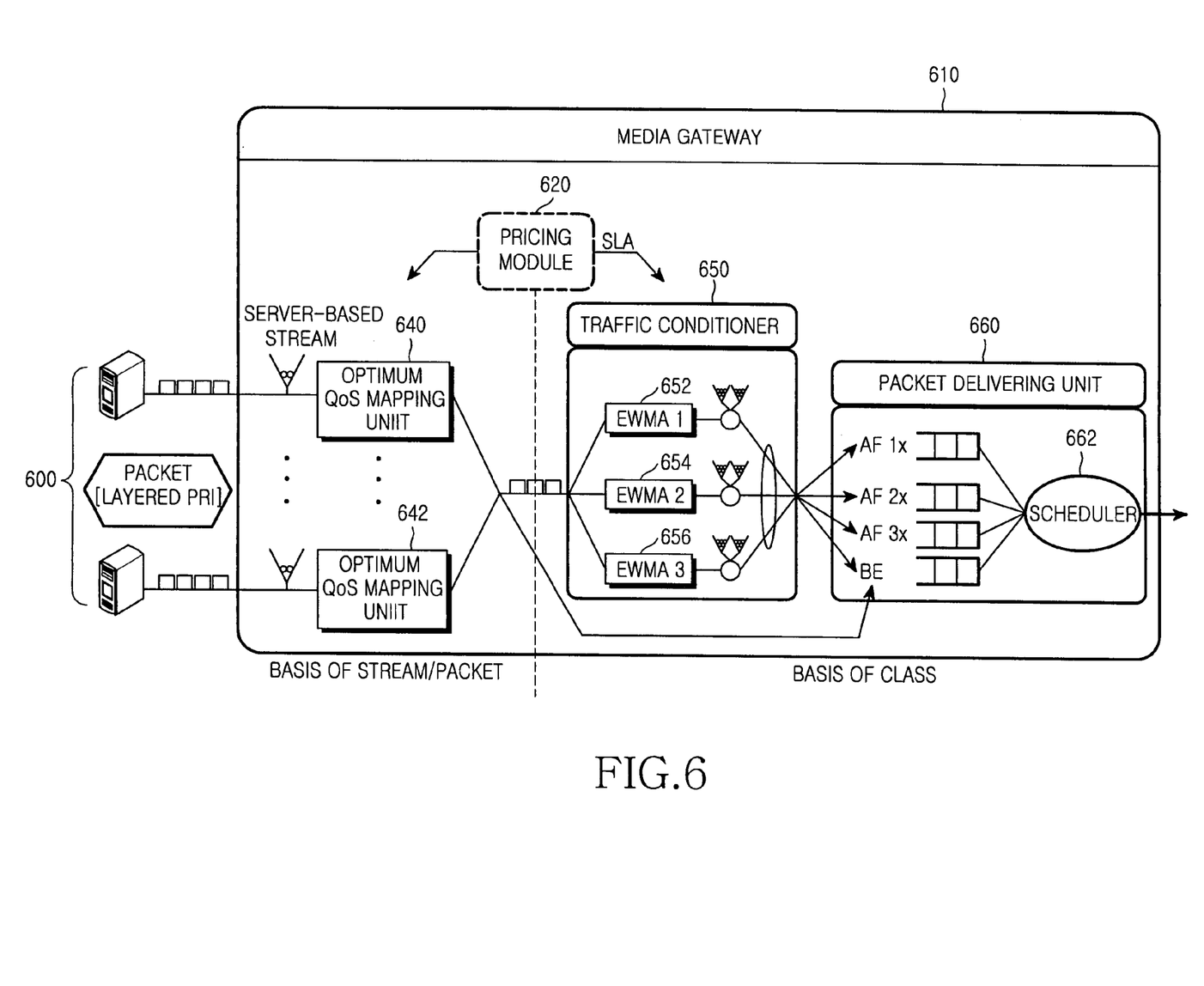
FIG. 6 shows the structure of a media gateway adaptable to a Diff-Serv environment according to the embodiment of the present invention.

FIG. 6 illustrates the structure of a media gateway 610 adaptable to a Diff-Serv environment according to the embodiment of the present invention. The media gateway 610 shown in FIG. 6 adjusts the maximum allowable transmission rate with respect to each flow by using a token bucket policy in order to solve problems of bandwidth management. In fact, dynamic QoS mapping control can be achieved through a transmission-rate control using an end-to-end adaptive streaming scheme described above. In operation, packets of each flow provided by media servers 600 have priorities identified by corresponding layered RPIs and are classified by the RPIs according to the priority classes in the media gateway 610. A pricing module 620 receives indications relating to system and network conditions from the monitoring server 320 and provides service level agreements (SLAs) according to the indications of the optimum QoS mapping units 640 to 642 and a traffic conditioner 650.

The optimum QoS mapping units 640 to 642 dynamically adjust classes mapped with the RPIs on the basis of indications from the monitoring server in order to dynamically control QoS. The traffic conditioner 650 includes a plurality of estimator weighted markers (EWMAs) 652, 654, and 656. The estimator weighted markers 652, 654, and 656 distinguish packets in streams of each server according to classes by using a marking scheme based on the token bucket and add marks representing corresponding classes to packets of the corresponding classes. The packets of each class are delivered to a packet-delivering unit 660. The classes are classified into EF (effort forwarding), AF (assured forwarding), BE (best effort) in a sequence in which a lower priority advances a higher priority. Herein, packets in the class BE are directly delivered to a packet-delivering unit 660 without passing through the traffic conditioner 650.

The packets of each class are formed as streams of each class in the packet delivering unit 660, and the streams are transmitted under the control of a scheduler 662. The scheduler 662 provides packets in streams of each class to a network through scheduling mechanisms such as queuing, random early detection, or weighted fair queuing (WFQ).

As described above, when high-density (HD) video is provided to match the tendency of broadcasting and communication convergence, it is possible to provide a delivery technique based on a media gateway that is capable of optimizing end-to-end quality of service and delivery efficiency.

While the invention has been shown and described with reference to certain preferred embodiments thereof, it will be understood by those skilled in the art that various changes in form and details may be made therein without departing from the spirit and scope of the invention. Consequently, the scope of the invention should not be limited to the embodiments, but it should be defined by the appended claims and equivalents thereof.

What is claimed is:

1. An apparatus for providing a dynamic quality-of-service (QoS) mapping in digital home service provided over a service network, comprising:
    a media server for providing network-adaptive media streams for the digital home service;
    a media gateway for coupling the media server to the service network;
    a plurality of clients coupled to the service network for receiving media streams from the media server, said clients measuring a network state of the service network and system states of the clients through a combination of active and passive monitoring of selected parameters associated with said service network and said client performance; and
    a monitoring server including a domain manager comprising:
        a collection module receiving the measured information about the network state and the system states from the clients;
        a condition analysis unit analyzing system conditions and network conditions based on the measured information provided through the collection module; and
        a network adaptation manager determining a type of problem associated with the media streams according to a predetermined policy comprising:
    a problem decision module for determining an overload type from the system overload, network overload, and system/network overload by receiving the system condition matrix and the network condition matrix; and
    a resource-management unit for creating one indication of a system overload indication, a network overload indication, and a system/network overload indication according to the determined overload type and transmitting the created indication to the media server and the media gateway.

2. The apparatus as claimed in claim 1, wherein the clients further includes a monitoring module comprising:

a passive monitoring module for analyzing real-time transport control protocol (RTCP) packets of the media streams to measure delay, jitters, and a loss rate of a user data flow and to measure the systems states of the clients; and an active monitoring module for measuring the network state of the service network by transmitting measurement packets generated by the active monitoring module to the service network.

3. The apparatus as claimed in claim 1, wherein the collection module further includes:

a passive monitoring module for receiving from the passive monitoring module of the clients a first metric information regarding a central process unit state and a memory state of the clients and a second metric information regarding delay, jitters, and loss rates for a user data flow of each client; and an active monitoring module for receiving a third metric information regarding delay, jitters, and loss rates of the service network.

4. The apparatus as claimed in claim 1, wherein the condition analysis unit further includes:

a system condition matrix creating unit for creating a system condition matrix using the first measurement information; and a network condition matrix creating unit for creating a network condition matrix using the second metric information and the third measurement information.

5. The apparatus as claimed in claim 4, wherein the system overload indication represents control over a transmission rate, filtering, and a coding rate for the media streams, the network overload indication represents whether or not FEC coding is applied to the media streams and a transmission rate is controlled with respect to the media streams, and the system/network overload indication represents control over a transmission rate for the media streams.

6. The apparatus as claimed in claim 1, wherein the media gateway further includes:

an estimation unit for determining an operation of the media gateway according to indication information sent from the monitoring server;

at least one optimum QoS mapping unit for receiving streams of each server from at least one media server and for mapping packets in the streams of each server to an optimum priority class under the control of the estimation unit;

a traffic controller for classifying the streams of each server according to priorities based on the priority class mapped by the optimum QoS mapping unit and for enabling a corresponding class on the streams according to priorities; and a packet-delivering unit for transmitting the streams according to the priority to the service network through scheduling.

7. A method for providing a dynamic quality-of-service (QoS) mapping in digital home service, the method comprising:

measuring a network state of a service network and system states of clients through a combination of active and passive monitoring in the clients coupled to a media server through the service network;

receiving metric information regarding said measured network state of the service network and system states of the client fed back from the clients;

performing comparison and analysis with respect to the received measurement information, determining causes of quality degradation of the digital home service by determining an overload type from the system overload, network overload, and system/network overload by receiving the system condition matrix and the network condition matrix;

creating one indication of a system overload indication, a network overload indication, and a system/network overload indication according to the determined overload type and transmitting the created indication to the media saver and the media gateway; and delivering indication information according to the causes of said degradation to the media server and the media gateway.

8. The method as claimed in claim 7, wherein measuring the network state of the service network and the system states of the clients includes:

a passive monitoring step of analyzing real-time transport control protocol (RTCP) packets of the media streams to measure delay, jitters, a loss rate of a user data flow and to measure the systems states of the clients; and an active monitoring step of measuring the network state of the service network by transmitting measurement packets created through active monitoring to the service network.

9. The method as claimed in claim 7, wherein delivering the indication information includes:

collecting metric information for the network state and the system states from the clients;

analyzing system conditions and network conditions based on the metric information; and determining a problem of the media streams according to a predetermined policy and an analysis result and creating the indication information in order to solve the problem.

10. The method as claimed in claim 9, wherein collecting the metric information includes:

receiving a first metric information regarding a central process unit state and a memory state of the clients and a second metric information regarding delay, jitters, and loss rates for a user data flow of each client from the clients; and receiving a third metric information regarding delay, jitters, and loss rates of the service network.

11. The method as claimed in claim 9, wherein analyzing the system conditions and the network conditions includes:

creating a system condition matrix by using the first measurement information; and creating a network condition matrix by using the second metric information and the third measurement information.

12. The method as claimed in claim 7, wherein the system overload indication represents control over a transmission rate, filtering, and a coding rate for the media streams, the network overload indication represents whether or not coding and control over a transmission rate are applied to the media streams, and the system/network overload indication represents control over a transmission rate for the media streams.

13. The method as claimed in claim 7, further comprising:

determining an operation of the media gateway according to indication information sent from the monitoring server;

receiving streams of each server from at least one media server and mapping packets in the streams of each sewer with an optimum priority class;

classifying the streams of each server according to priorities based on the mapped priority class and marking a corresponding class on the streams according to the priority; and transmitting the streams according to priorities to the service network through scheduling.

* * * * *